United States Patent
Niskanen

(10) Patent No.: US 11,491,557 B2
(45) Date of Patent: *Nov. 8, 2022

(54) DRILL BYPRODUCT CAPTURING DEVICE

(71) Applicant: Bruce A. Niskanen, Buffalo, MN (US)

(72) Inventor: Bruce A. Niskanen, Buffalo, MN (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/904,164

(22) Filed: Jun. 17, 2020

(65) Prior Publication Data

US 2020/0316693 A1     Oct. 8, 2020

Related U.S. Application Data

(63) Continuation of application No. 16/193,670, filed on Nov. 16, 2018, now Pat. No. 10,722,952.

(60) Provisional application No. 62/588,035, filed on Nov. 17, 2017.

(51) Int. Cl.
*B23B 35/00* (2006.01)
*B23B 47/34* (2006.01)
*B23Q 11/00* (2006.01)

(52) U.S. Cl.
CPC .......... *B23B 47/34* (2013.01); *B23B 35/00* (2013.01); *B23Q 11/0064* (2013.01); *B23Q 11/0071* (2013.01)

(58) Field of Classification Search
CPC .......... B23Q 11/0053; B23Q 11/0064; B23Q 11/0071; B23B 35/00
See application file for complete search history.

(56) References Cited

U.S. PATENT DOCUMENTS

| | | | |
|---|---|---|---|
| 2,548,314 | A | 4/1951 | Kinney |
| 4,251,171 | A | 2/1981 | Brett |
| 5,087,158 | A | 2/1992 | Devine |
| 6,505,967 | B1 | 1/2003 | Alfero-Kuronya |
| 6,974,048 | B2 | 12/2005 | Funk |
| D588,893 | S | 3/2009 | Radich |
| 7,883,301 | B2 | 2/2011 | Oostman |
| 2005/0047880 | A1 | 3/2005 | Seely |
| 2011/0274508 | A1 | 11/2011 | Russell |
| 2019/0151957 | A1 | 5/2019 | Niskanen |

FOREIGN PATENT DOCUMENTS

WO     2004020157 A2     10/2004

*Primary Examiner* — Alan Snyder
(74) *Attorney, Agent, or Firm* — Christopher R. Christenson; Kelly, Holt & Christenson, PLLC

(57) ABSTRACT

A container assembly for retaining a drill byproduct produced when drilling into a wall, the container assembly includes a container disposed on an internal side of the wall having an internal surface and an external surface. The container assembly also includes a sleeve that is disposed about the external surface of the container, the sleeve includes one or more magnets that couple the sleeve and container to the wall and retain the drill byproduct along the internal surface.

16 Claims, 5 Drawing Sheets

DRILL BYPRODUCT CAPTURING DEVICE

CROSS-REFERENCE TO RELATED APPLICATION

The present application is a continuation of and claims priority of U.S. patent application Ser. No. 16/193,670, filed Nov. 16, 2018, which is based on and claims the benefit of U.S. provisional patent application Ser. No. 62/588,035, filed Nov. 17, 2017, the content of which is hereby incorporated by reference in its entirety.

BACKGROUND

When installing electrical systems specifically connecting to panels or boxes it is common to drill a hole into the side of the box for access to the internal components of the panel or box. There are many safety protocols against drilling into a box or panel while the box or panel is live, that is having an electrical current flowing through the box. When drilling metal shavings can fall into components of the box that can cause a short and other damage.

The discussion above is merely provided for general background information and is not intended to be used as an aid in determining the scope of the claimed subject matter.

SUMMARY

A container assembly for retaining a drill byproduct produced when drilling into a wall, the container assembly includes a container disposed on an internal side of the wall having an internal surface and an external surface. The container assembly also includes a sleeve that is disposed about the external surface of the container, the sleeve includes one or more magnets that couple the sleeve and container to the wall and retain the drill byproduct along the internal surface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
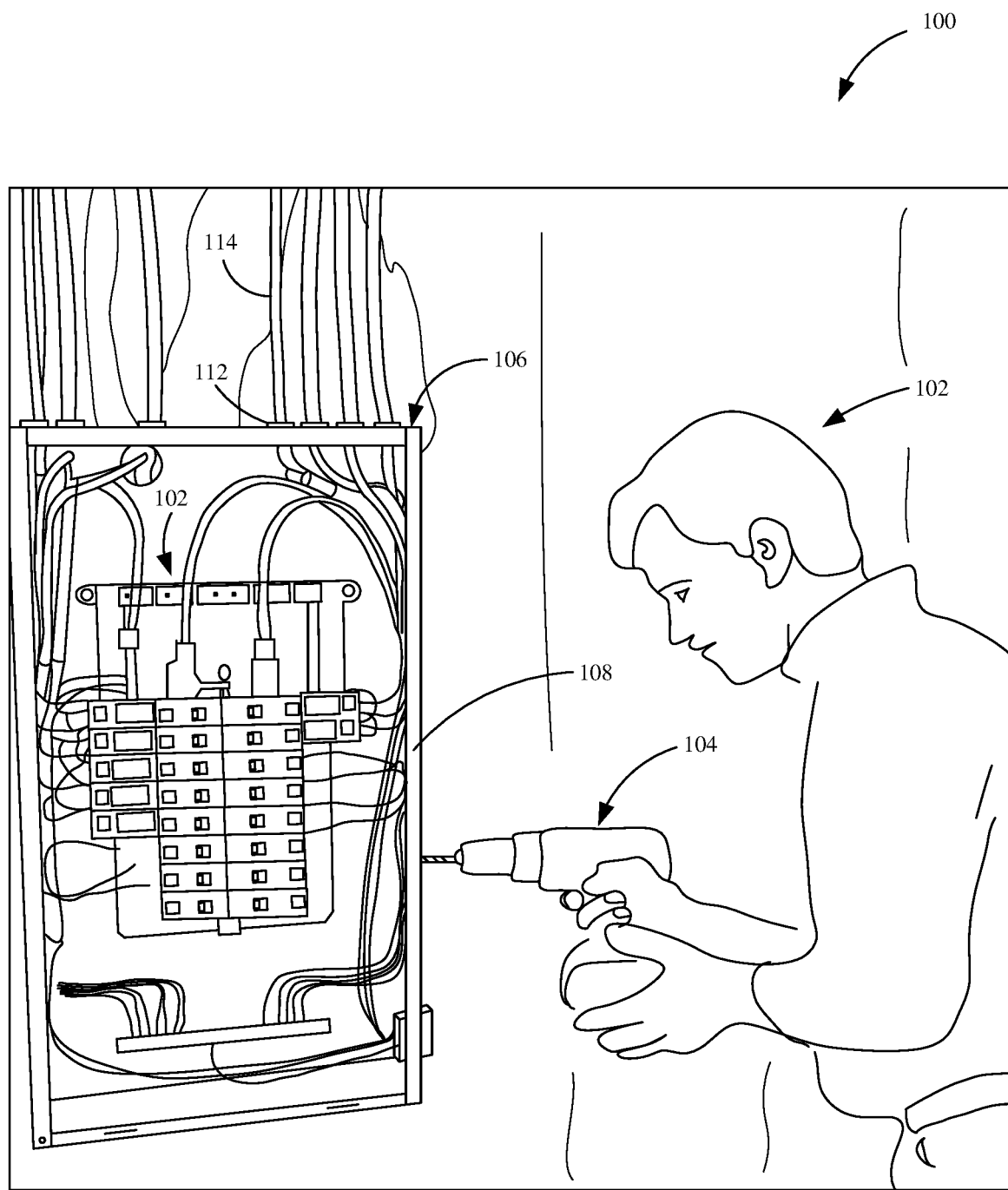
FIG. 1 is a perspective view showing one example electrical installation environment.

FIG. 1 is a perspective view showing one example electrical installation environment 100. Environment 100 includes an operator 102, a drill 104, and a panel 106. Panel 106 serves as an electrical junction and is connected to a variety of wires 114 or conduit. These wires 114 carry electricity either in or out of panel 106. Each wire 114 can represent a circuit and can have a corresponding fuse or breaker in panel 106. When a new circuit is to be established, operator 102 drills a hole in panel 106, thus allowing access for another wire 114 to internal components of panel 106.

As shown operator 102 is operating drill 104 to drill a hole in wall 108 of panel 106. It is important that when an operator 102 is drilling a hole in wall 108, the drill and its components do not contact the electronics 102 within panel 106. This is especially true when panel 106 is live, such that there is electricity flowing through electronics 102. Additionally, when a drill is drilling through wall 108, shavings or other debris can be generated or removed. Panels 106 are generally made from a metal material and the shavings generated during drilling of wall 108 are conductive and can cause contaminate or other problems with electronics 102. For example, contamination may result in arc hazards, explosion or failure of the equipment. As such is important that shavings do not fall within, and contaminate, the electronics 102. Another hazard present in the environment 100 is that when drill 104 punctures through wall 108 drill 104 can penetrate through with some force and drill 104 may contact some part of electronics 102 that can either damaged electronics 102 or in the case where electronics 102 are live, injure operator 102 or drill 104.

Operator 102 drills a hole in wall 108 with drill 104, in some instances to allow a device similar to connector 112 to be inserted in wall 108 and allow either a wire 114 or some other conduit can be coupled to panel 106. This of course, is only one application of the following description. The following disclosed devices are not limited to electrical applications and can be used in any wall drilling or penetrating application where prevention of contamination of adjacent spaces and equipment is desired. Applications that require extra cleanliness are especially recognized for example only, such as data centers or areas where there is sensitive equipment, food production facilities, other sensitive production areas, etc.

Figure 2:
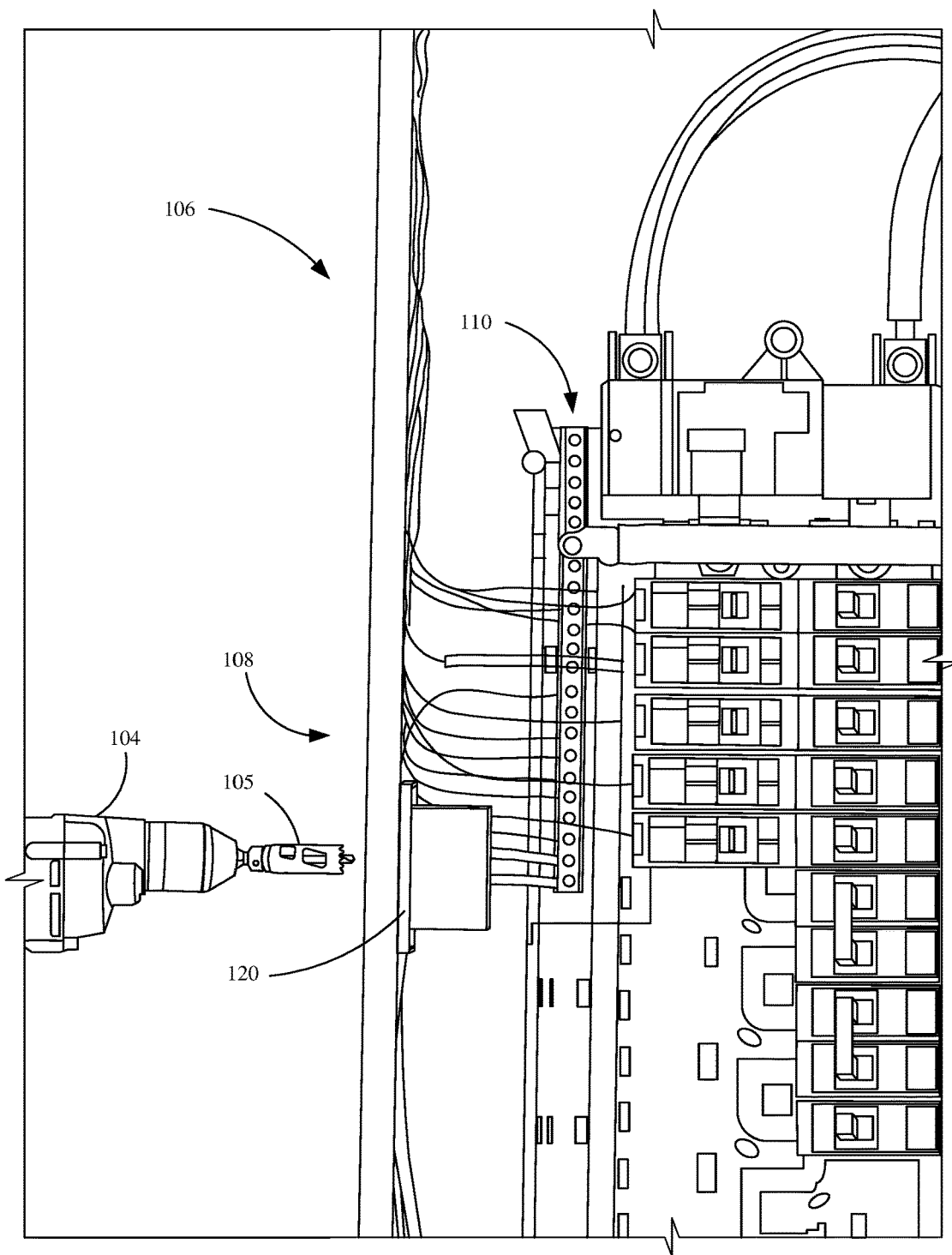
FIG. 2 is a perspective view showing one example electrical installation environment.

FIG. 2 is a perspective view showing one example electrical installation environment. FIG. 2 has some similar components to those described in FIG. 1 and the components are similarly numbered. In environment 200, drill 104 has a bit 105 coupled to an operating end of drill 104. Bit 105 rotates to penetrate a hole in wall 108. Bit 105 as shown is a hole saw, in other examples bit 105 can be another type of bit as well. In some examples, drill 104 is replaced with a punch or some other device that can puncture a hole in wall 108.

As shown, container 120 is coupled to the inside of wall 108. Container 120 has an internal surface that can collect any byproduct or shavings generated by bit 105 drilling through wall 108. Container 120 prevents the shavings from encountering or contaminating electronics 110 or any other internal surface of panel 106. This can help prevent hazards that may ensue if the shavings cause a short and can also make cleanup easier. As shown, container 120 is a rectangular box, however in other examples, container 120 can be a different shape as well, such as cylindrical, spherical, etc. Container 120 can be either narrower or wider depending on the depth of panel 106. Container 120 can also be deeper or shallower depending on the dimensions of panel 106 and electronics 110.

Many panels are made out of a ferrous metal, such as steel. Accordingly, it can be beneficial to incorporate magnets on container 120 to gather the ferrous byproduct from the drilling process. These magnets may also couple container 120 to the internal surface of wall 108, in place of, or, in some examples, addition to, a clamp or other coupling device.

Figure 3:
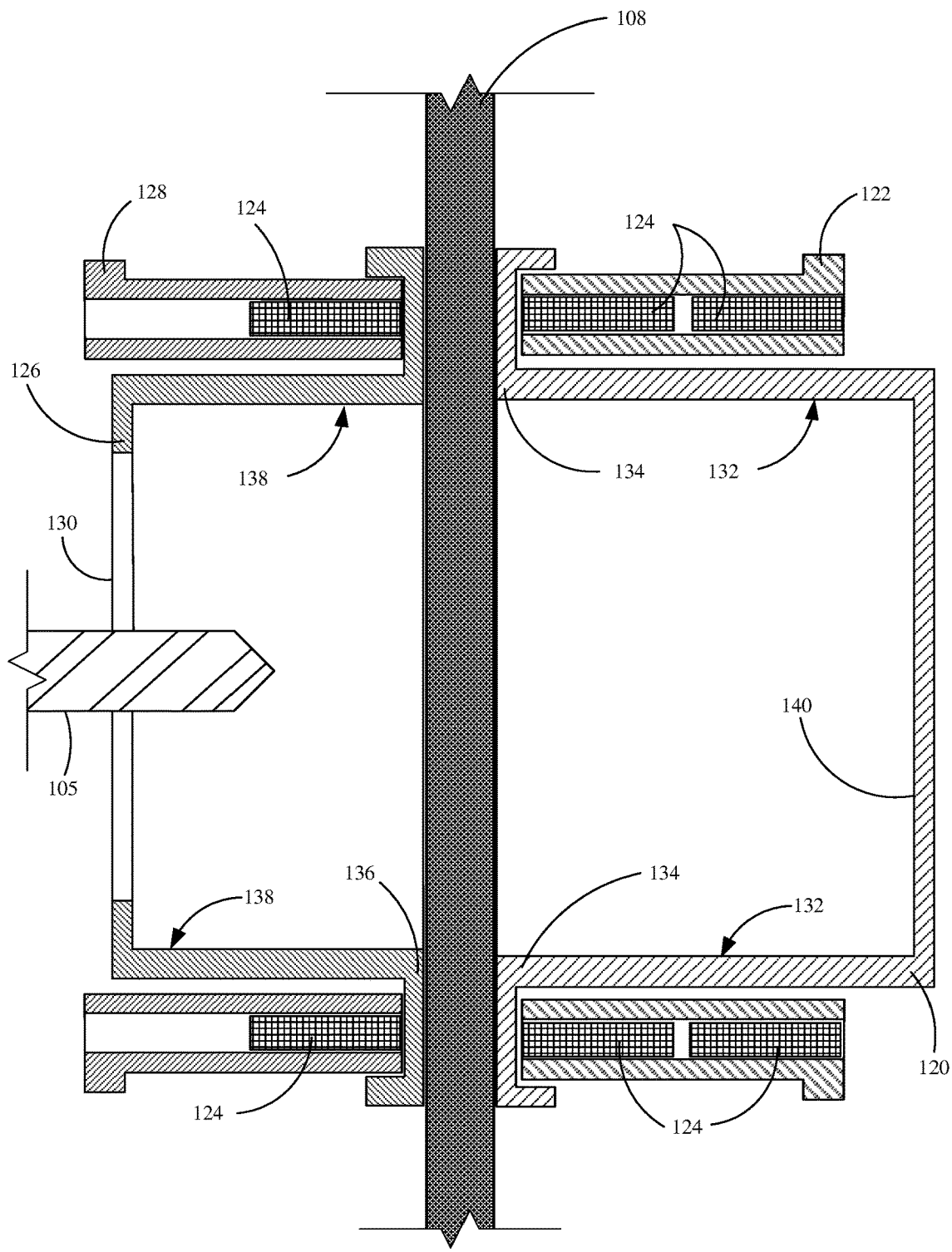
FIG. 3 is a sectional view showing one example operation of the catch box.

FIG. 3 is a sectional view showing one example operation of the catch box. Some of the components and environment 300 are similar to those in as environment a 200 and the components are similarly numbered.

Container 120 as shown is disposed on the internal surface of wall 108. Container 120 can be held in this position by sleeve 122 and magnets 124 which as shown for example, are disposed about the external surface of container 120. In one example, wall 108 is composed, at least partially, of a ferrous metal that magnets 124 are attracted to. The magnetic field, generated by magnets 124, pulls sleeve 122 towards wall 108 and cause contact portions 134 of container 120 to be press against wall 108. Frictional forces generated between contact portion 134 and wall 108 keep container 120 from falling under its own weight and the weight of any shavings that it may gather. Contact portions 134 can define an open end that is oriented towards wall 108, it is "open" meaning that bit 105 can cut through wall 108 without contacting a solid portion of container 120. Contact portions 134 can include higher friction surfaces to help keep container 120 from sliding down wall 108 under its own weight. Contact portions 134 can also include seals that further ensure byproducts from the drilling process do not fall outside container 120 and into the internal compartment of panel 106. Contact surface 136 of through container 126 can also have similar features.

Container 120 has internal surfaces that include rear wall 140 and side walls 132, that capture drilling byproduct. Side walls 132 are typically where byproduct is captured. This is because magnets 124 align with side walls 132. In some examples, magnets 124 also sit behind rear wall 140 and thus byproduct can be held against rear wall 140 as well. Rear wall 140 can be reinforced to prevent bit 105 from puncturing or damaging rear wall 140. In one example, reinforcing can occur just on rear wall 140 and the rest of container 120 can be made of a less expensive material, resulting in manufacturing expense savings with minimal performance differences. Container 120 can comprise rigid materials, for example, aluminum, stainless steel, other metal, plastic, etc. Container 120 can in addition to the alternate comprise flexible materials, for example, silicon, rubber, plastic, bag, etc. In some examples, a bag or liner can be used inside of container 120.

Through container 126, as shown, is disposed on the external surface of wall 108 (e.g., the side of wall 108 where the drill or other puncturing device is located). Through container 126 can be held in this position against wall 108 by sleeve 128 and magnets 124. In one example, wall 108 includes a ferrous metal that magnets 124 are attracted to. The magnetic field generated by magnets 124 pull sleeve 128 towards wall 108 and cause contact portions 136 of through container 126 to be press against wall 108. Frictional forces generated between contact portion 136 and wall 108 keep through container 126 from following under its own weight and the weight of any shavings that it may gather. Contact portions 136 can define an open end that is oriented towards wall 108, it is "open" meaning that bit 105 can access wall 108 without contacting a solid portion of container 126. Contact portions 136 can include higher friction surfaces to help keep container 126 from sliding down wall 108 under its own weight. Contact portions 136 can also include seals that further ensure byproducts from the drilling process do not fall outside container 126.

Through container 126 has an internal surface including side walls 138 and front wall 139 that capture drilling byproduct. Side walls 138 are typically where byproduct is captured. This is because magnets 124 align with side walls 138. In some examples, magnets 124 also sit along front wall 139 around through-hole 130. The depth of side walls 138 can be chosen to accommodate different lengths of bit 105. For example, it may be that the depth of side walls 138 prevent bit 105 from contacting rear wall 140. For instance, assume in one example that bit 105 extends 3 inches beyond the end of a drill, wall 108 is ⅛-inch-thick and rear wall 140 is disposed 1 inch behind wall 108. In this example, the depth of side wall 138 could be between 1⅞ and 2⅞ inches to allow bit 105 to penetrate wall 108 but not contact rear wall 140. In some examples, contacting rear wall 140 with too much force could uncouple container 120 from wall 108.

Through-hole 130 is disposed in front wall 139 to allow drilling access to wall 108. Through-hole 130 can be a variety of different sizes and shapes to accommodate different bits or penetrating devices. For example, through-hole 130 may allow for clearance of a bit but substantially prevent debris from exiting through-hole 130. For instance, bit 105 may have a 1-inch diameter and through-hole 130 may have a 1¼-inch diameter. In some examples, front wall 139 can be reinforced around through-hole 130 to prevent bit 105 from puncturing or damaging front wall 139. For example, a metal or other durable material is disposed around through-hole 130. In one example, reinforcing can occur just occur around through-hole 130 and the rest of through container 126 can be made of a less expensive material, resulting in manufacturing expense savings with minimal performance differences. Through container 126 can comprise rigid materials, for example, metal, plastic, etc. Through container 126 can, in addition to or in the alternate, comprise flexible materials, for example, silicon, rubber, plastic, bag, etc.

Figure 4:
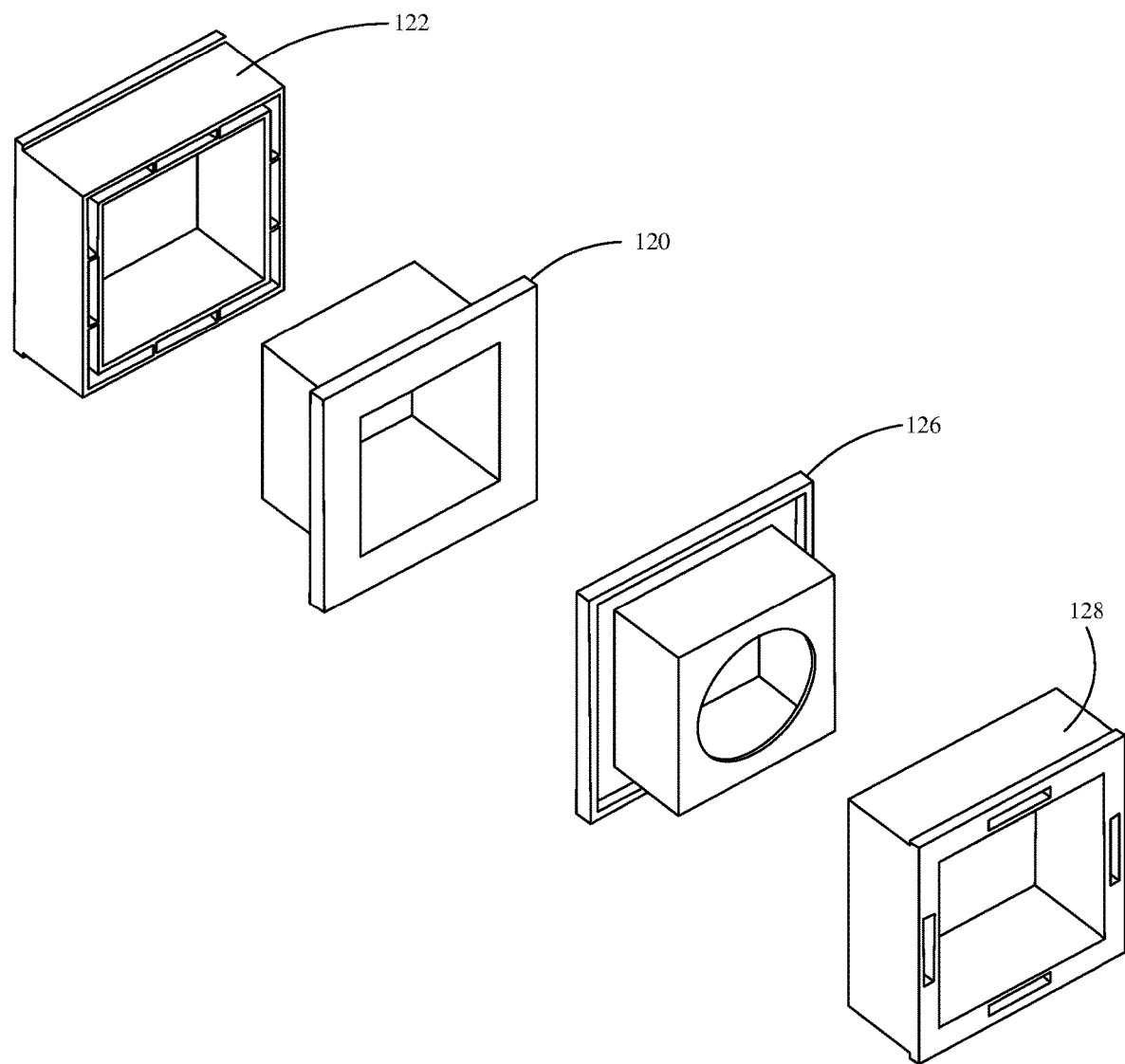
FIG. 4 is an exploded view showing one example of a catch box.

FIG. 4 is an exploded view showing one example of a catch box. As shown, catch box assembly 400 includes rectangular examples of sleeve 122, container 120, through container 126, sleeve 128 and magnets 124. Sleeve 122 houses a plurality of different magnets 124. In one example, magnets 124 are permanently embedded in sleeve 122. In another example, magnets 124 are removable from sleeve 122. As shown, there are twelve magnets in sleeve 122, however in other examples there may be fewer or greater amounts of magnets 124. Sleeve 122 fits over an external surface of container 120. Container 120 is disposed on an interior side of a wall that is to be drilled. Container 120 is held against the wall by sleeve 122 and magnets 124. Similarly, sleeve 128 houses a variety of magnets 124 that hold through container 126 to a wall to be drilled. In one example, magnets 124 are aligned such that, when the assembly is not coupled to a wall, magnets 124 will keep all pieces of the assembly together during non-use. Magnets 124 can be one of a variety of different types. For example, rare earth magnets, controllable electromagnets, etc.

Through container 126 has a through-hole 130 where a drill is inserted to drill a hole in a wall. Through-hole 130 can be a variety of different sizes and shapes. As shown, through-hole 130 is a circular hole, however in other examples through-hole 130 can be a different shape as well. For example, rectangular. As shown, sleeves 122 and 128 are rings that do not fully cover containers 120 and 126. In some examples, sleeves 122 and 128 fully encompass their respective containers. In some examples sleeve 122 and sleeve 128 are not needed and magnets 124 are mounted on container 120 and through container 126.

Figure 5A:
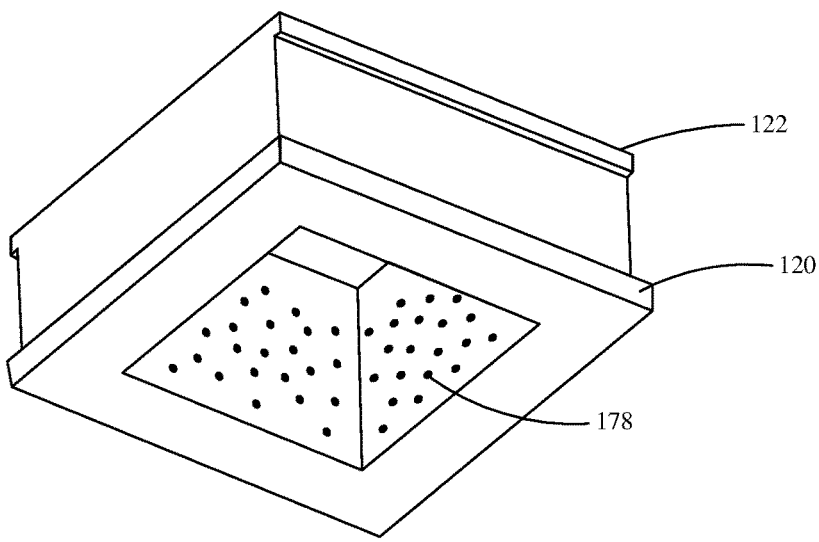
FIG. 5A is a perspective view showing one example catch box assembly.

FIG. 5A is a perspective view showing one example catch box assembly. As shown, container 120 has a variety of drill byproduct 178 along sidewalls 132 and rear wall 140. Drill byproduct 178 is held against sidewalls 132 and/or rear wall 140 by magnets 124 within sleeve 122. Normally it would be difficult to remove this by product from magnets 124, however, the catch box assembly makes disposal of byproduct 178 simple, as shown in FIG. 5B.

Figure 5B:
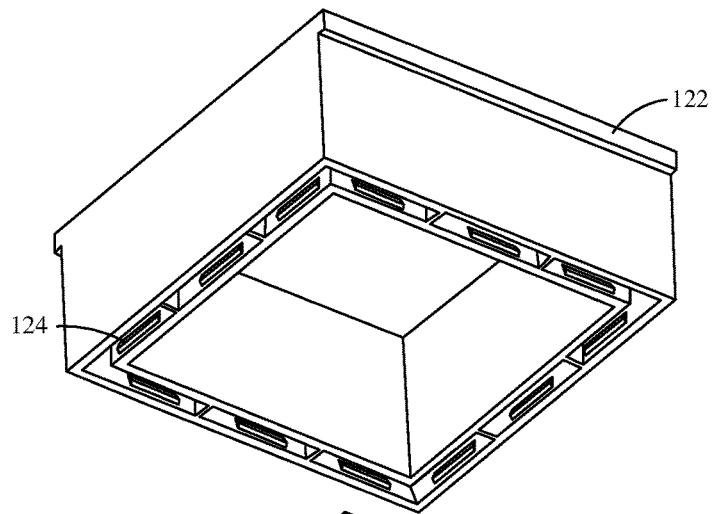
FIG. 5B is a perspective view showing one example retracted catch box assembly.
Figure 5B:
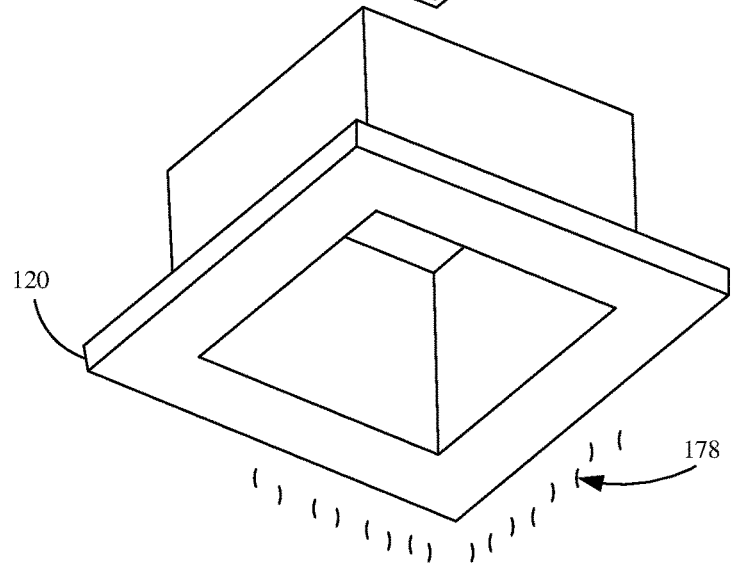

FIG. 5B is a perspective view showing one example of a retracted catch box assembly. As shown, sleeve 122 has been removed from container 120. This removal causes drill byproduct 178 to fall from container 120 as there is no longer a magnetic force strong enough to hold the drill byproduct 178 within container 120 (e.g., along the internal surfaces of container 120). If container 120 comprises a non-magnetic material and a low friction surface, byproduct 178 simply falls away from container 120 under the force of gravity, as shown.

Although the present invention has been described with reference to preferred embodiments, workers skilled in the art will recognize that changes may be made in form and detail without departing from the spirit and scope of the invention.

What is claimed is:

1. A container assembly for retaining a drill byproduct produced when drilling into a wall, the container assembly comprising:
    a container disposed on an internal side of the wall having an internal surface and an external surface;
    a sleeve that is disposed about the external surface of the container, the sleeve comprising one or more internal magnets that couple the sleeve and the container to the wall and retain the drill byproduct along the internal surface;
    a second container disposed on a second side of the wall that is opposite the internal side of the wall;
    a second sleeve disposed about an external surface of the second container, the second sleeve comprising one or more external magnets that couple the second sleeve and the second container to the wall and retain a portion of the drill byproduct along an internal surface of the second container.

2. The container assembly of claim 1, wherein the second container comprises a through-hole configured to allow a wall puncturing device access to the wall.

3. The container assembly of claim 2, wherein a portion of the second container around the through-hole is reinforced.

4. The container assembly of claim 1, wherein the one or more internal magnets and external magnets are aligned such that they attract and hold the container assembly together.

5. The container assembly of claim 1, wherein the container and the sleeve are separate components, removably separable from each other.

6. The container assembly of claim 1, wherein the one or more internal magnets are permanently disposed in the sleeve.

7. The container assembly of claim 1, wherein the container comprises four internal side walls and one rear wall.

8. The container assembly of claim 7, wherein the one rear wall comprises a reinforcing component.

9. The container assembly of claim 1, wherein the container comprises a flexible material.

10. The container assembly of claim 1, wherein the container and the sleeve comprise a rigid material.

11. The container assembly of claim 1, wherein the sleeve is a ring.

12. A method of drilling a hole in an electrical panel wall, the method comprising:
    placing a container on an interior surface of the electrical panel wall;
    coupling the container to the interior surface of the electrical panel wall;
    wherein coupling the container to the interior surface of the electrical panel wall comprises placing a magnetic sleeve over the container such that a magnet of the magnetic sleeve is attracted to the electrical panel wall;
    drilling the hole with a drill bit, wherein the hole aligns with an internal compartment of the container;
    placing a second container on an exterior surface of the electrical panel wall;
    coupling the second container to the exterior surface of the electrical panel wall; and
    wherein coupling the second container to the exterior surface comprises placing a second magnetic sleeve over the second container such that a second magnet of the second magnetic sleeve is attracted to the electrical panel wall.

13. The method of claim 12, wherein drilling the hole comprises inserting the drill bit through a through-hole of the second container.

14. The method of claim 12, further comprising capturing drill byproduct on an interior surface of the container, with the magnet.

15. The method of claim 14, removing the magnetic sleeve from the container such that a drill byproduct is released from the interior surface of the container.

16. A kit for drilling a hole in a wall of an electrical panel, this kit comprising:
    a container comprising:
        an internal compartment configured to receive drill byproduct; and
        an open end that aligns with the hole;
    a sleeve configured to be disposed about the external surface of the container and couple the container to the wall, the sleeve comprising a magnet configured to attract byproduct created during drilling of the hole;
    a drill bit configured to drill the hole in the wall;
    a second container having a through-hole configured to receive the drill bit prior to drilling the hole; and
    a second sleeve configured to fit around an exterior of the second container and couple the second container to the wall.

* * * * *